(12) United States Patent
Kosugi (10) Patent No.: US 12,417,271 B2
(45) Date of Patent: Sep. 16, 2025

(54) ELECTRONIC APPARATUS AND CONTROL METHOD

(71) Applicant: Lenovo (Singapore) Pte. Ltd., Singapore (SG)

(72) Inventor: Kazuhiro Kosugi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 393 days.

(21) Appl. No.: 18/053,760

(22) Filed: Nov. 9, 2022

(65) Prior Publication Data

US 2023/0205858 A1    Jun. 29, 2023

(30) Foreign Application Priority Data

Dec. 23, 2021   (JP) ................................. 2021-209679

(51) Int. Cl.
| | | |
|---|---|---|
| G06F 21/32 | (2013.01) | |
| G06T 7/62 | (2017.01) | |
| G06T 7/70 | (2017.01) | |
| G06V 10/60 | (2022.01) | |
| G06V 40/16 | (2022.01) | |

(52) U.S. Cl.
CPC ............... *G06F 21/32* (2013.01); *G06T 7/62* (2017.01); *G06T 7/70* (2017.01); *G06V 10/60* (2022.01); *G06V 40/161* (2022.01); *G06T 2207/30201* (2013.01)

(58) Field of Classification Search
CPC ...... G06F 1/3231; G06F 21/32; G06F 21/575; G06T 7/62; G06T 7/70; G06T 2207/30201; G06V 10/60; G06V 10/96; G06V 40/161; G06V 40/166; G06V 40/172; G06V 40/20
See application file for complete search history.

(56) References Cited

U.S. PATENT DOCUMENTS

| | | | | |
|---|---|---|---|---|
| 10,834,461 | B1 * | 11/2020 | Kosugi | H04N 21/6587 |
| 2014/0337654 | A1 * | 11/2014 | Chen | G06F 1/3231 |
| | | | | 713/323 |
| 2015/0124084 | A1 * | 5/2015 | Ikenoue | A63F 13/213 |
| | | | | 348/135 |

(Continued)

FOREIGN PATENT DOCUMENTS

| | | |
|---|---|---|
| JP | 2015011537 A | 1/2015 |
| JP | 2016-148895 A | 8/2016 |

(Continued)

*Primary Examiner* — Ping Y Hsieh
*Assistant Examiner* — Jose M Torres
(74) *Attorney, Agent, or Firm* — Osha Bergman Watanabe & Burton LLP (57) ABSTRACT

An electronic apparatus includes a memory which temporarily stores image data of an image captured by an imaging device, and a processor which processes image data stored in the memory to execute boot processing to boot a system from a standby state based on an authentication result by face authentication. The processor processes image data of an image captured by the imaging device and stored in the memory in the standby state to detect, from the image, a face area in which a face that satisfies possible conditions for face authentication is captured, and when a face area that satisfies the possible conditions for face authentication is detected from the image, the processor gives a boot instruction to execute the boot processing.

6 Claims, 7 Drawing Sheets

(56) References Cited

U.S. PATENT DOCUMENTS

| | | | | |
|---|---|---|---|---|
| 2016/0371535 A1* | 12/2016 | Li | .................... | G06V 40/172 |
| 2017/0346851 A1* | 11/2017 | Drake | .................... | H04L 9/0838 |
| 2019/0042756 A1* | 2/2019 | Lal | .................... | H04L 9/3234 |
| 2019/0109846 A1* | 4/2019 | Shieh | .................... | H04L 63/0861 |
| 2019/0281200 A1* | 9/2019 | Files | .................... | G06V 10/12 |
| 2020/0193068 A1* | 6/2020 | Jones | .................... | G06T 7/20 |
| 2020/0356160 A1* | 11/2020 | Kosugi | .................... | G06F 1/3231 |
| 2022/0382359 A1* | 12/2022 | Kosugi | .................... | G06F 1/3231 |
| 2023/0012914 A1* | 1/2023 | Utsumi | .................... | G06T 7/73 |
| 2023/0142255 A1* | 5/2023 | Kajiki | .................... | H04L 9/3231 |
| | | | | 382/118 |

FOREIGN PATENT DOCUMENTS

| | | |
|---|---|---|
| JP | 2017034518 A | 2/2017 |
| JP | 2018195067 A | 12/2018 |
| JP | 2019142125 A | 8/2019 |
| JP | 2019174855 A | 10/2019 |

* cited by examiner

ELECTRONIC APPARATUS AND CONTROL METHOD

CROSS-REFERENCE TO RELATED APPLICATIONS

This application claims priority to Japanese Patent Application No. 2021-209679 filed on Dec. 23, 2021, the contents of which are hereby incorporated herein by reference in their entirety.

TECHNICAL FIELD

The present invention relates to an electronic apparatus and a control method.

BACKGROUND

There is an electronic apparatus which makes a transition to a usable state when a person approaches or to a standby state in which functions except some of the functions are stopped when the person leaves. For example, in Japanese Unexamined Patent Application Publication No. 2016-148895, an infrared sensor is used to detect whether a person is approaching or a person goes away.

In recent years, with the development of computer vision and the like, detection accuracy when detecting a face from an image has been getting higher. Therefore, face detection is beginning to be used instead of person detection using the infrared sensor. Further, although authentication (for example, login authentication) of whether or not a user is an authorized user is performed at startup of an electronic apparatus, face authentication is becoming more and more used as this authentication method. For example, when a person approaches, the electronic apparatus detects a face to start up, and then performs face authentication of the detected face to allow login so as to make a transition to a usable state.

However, even when the electronic apparatus detects a face to start up, the face may not be able to be authenticated if the person is too far away or too close, or the face is in profile. Thus, even in such a situation that the face cannot be authenticated, the face may be detected to start up the electronic apparatus unnecessarily.

SUMMARY

One or more embodiments of the present invention provide an electronic apparatus and a control method for reducing unnecessary booting.

In one or more embodiments, an electronic apparatus, which executes boot processing to boot a system from a standby state based on an authentication result by face authentication, includes: a memory which temporarily stores image data of an image captured by an imaging device; and a processor which performs processing based on image data stored in the memory, wherein the processor performs face detection processing to process image data of an image captured by the imaging device and stored in the memory in the standby state in order to detect, from the image, a face area in which a face that satisfies possible conditions for the face authentication is captured, and when a face area that satisfies possible conditions for the face authentication is detected from the image by the face detection processing, the processor performs boot instruction processing to execute the boot processing.

The above electronic apparatus may also be such that the function of the face authentication can be set to be enabled or disabled, and when the function of the face authentication is set to be enabled, the processor detects, by the face detection processing, the face area that satisfies the possible conditions for the face authentication.

The above electronic apparatus may further be such that the possible conditions for the face authentication include a condition on the size of a face captured in the image relative to an area of the image.

Further, the above electronic apparatus may be such that the possible conditions for the face authentication include a condition on the position of a face captured in the image within an area of the image.

Further, the above electronic apparatus may be such that the possible conditions for the face authentication include a condition on the orientation of a face captured in the image.

Further, the above electronic apparatus may be such that the possible conditions for the face authentication include a condition on the brightness of a usage environment of the electronic apparatus.

Further, the above electronic apparatus may be such that, when the function of the face authentication is set to be disabled, the processor detects a face area with a face captured therein from the image in the face detection processing regardless of whether or not the face area satisfies the possible conditions for the face authentication, and when the face area is detected from the image by the face detection processing, the processor executes the boot processing in the boot instruction processing.

Further, a control method according to the second aspect of the present invention is a control method for an electronic apparatus including: a memory which temporarily stores image data of an image captured by an imaging device; and a processor which performs processing based on image data stored in the memory, to execute boot processing for booting a system from a standby state based on an authentication result by face authentication, the control method including: a step of causing the processor to process image data of an image captured by the imaging device and stored in the memory in the standby state in order to detect, from the image, a face area in which a face that satisfies possible conditions for the face authentication is captured; and a step in which when a face area that satisfies possible conditions for the face authentication is detected from the image, the processor performs the boot processing.

The above-described aspects of the present invention can reduce unnecessary booting.

DETAILED DESCRIPTION

Embodiments of the present invention will be described below with reference to the accompanying drawings.

First Embodiment

Outline

First, the outline of an electronic apparatus 1 according to a first embodiment will be described. The electronic apparatus 1 according to one or more embodiments is, for example, a laptop PC (Personal Computer). Note that the electronic apparatus 1 may also be any other form of electronic apparatus such as a desktop PC, a tablet terminal device, or a smartphone.

The electronic apparatus 1 can make a transition at least between a normal operating state (power-on state) and a standby state as system operating states. The normal operating state is an operating state capable of executing processing without being particularly limited, which corresponds, for example, to S0 state defined in the ACPI (Advanced Configuration and Power Interface) specification. The standby state is a state in which the use of at least part of system processing is limited. For example, the standby state may be the standby state or a sleep state, modern standby in Windows (registered trademark), a state corresponding to S3 state (sleep state) defined in the ACPI specification, or the like. For example, the standby state is an operating state lower in power consumption than the normal operating state.

In the following, a transition of the system operating state from the standby state to the normal operating state may also be called "boot." In the standby state, since the activation level is generally lower than that in the normal operating state, the boot of the system of the electronic apparatus 1 leads to the activation of the operation of the system in the electronic apparatus 1.

Figures 1, 1A, 1B, 1C:
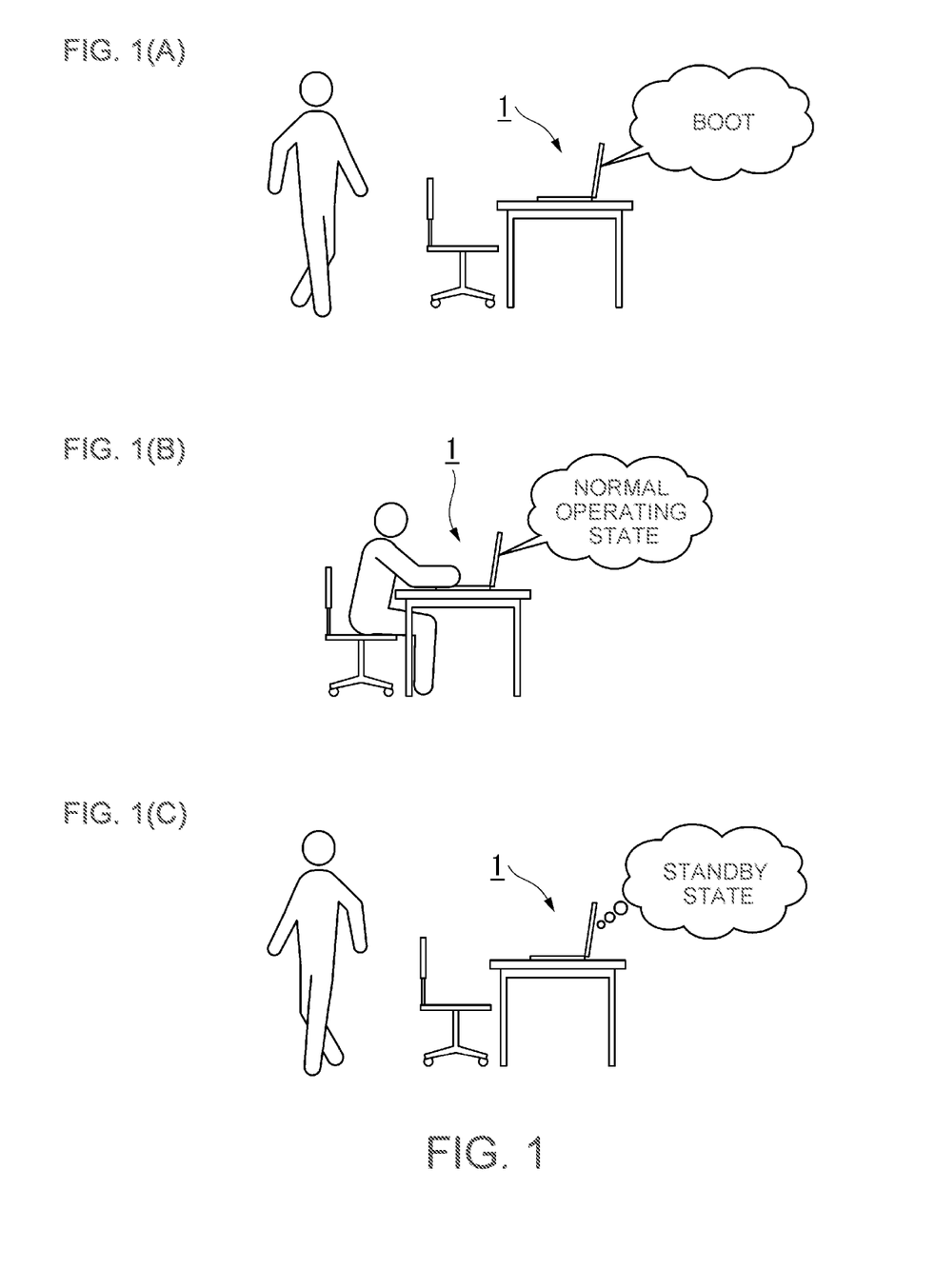
FIGS. 1(A)-1(C) are diagrams for describing an outline of HPD processing of an electronic apparatus according to one or more embodiments.

FIGS. 1(A)-1(C) are diagrams for describing an outline of HPD processing of the electronic apparatus 1 according to one or more embodiments. The electronic apparatus 1 detects a person (i.e., the user) present in the neighborhood of the electronic apparatus 1. This processing to detect the presence of a person is called HPD (Human Presence Detection) processing. The electronic apparatus 1 detects the presence or absence of a person by the HPD processing to control the operating state of the system of the electronic apparatus 1 based on the detection result. For example, as illustrated in FIG. 1(A), when detecting a change from a state where no person is present in front of the electronic apparatus 1 (Absence) to a state where a person is present (Presence), that is, when detecting that a person has approached the electronic apparatus 1 (Approach), the electronic apparatus 1 determines that the user has approached and automatically boots the system to make the transition to the normal operating state. Further, in a state where a person is present in front of the electronic apparatus 1 (Presence) as illustrated in FIG. 1(B), the electronic apparatus 1 determines that the user is present and continues the normal operating state. Then, as illustrated in FIG. 1(C), when detecting a change from the state where the person is present in front of the electronic apparatus 1 (Presence) to a state where no person is present (Absence), that is, when detecting that the person has left the electronic apparatus 1 (Leave), the electronic apparatus 1 determines that the user has left and causes the system to make the transition to the standby state.

The electronic apparatus 1 detects the presence of a person within a predetermined forward (front-side) range.

Figure 2:
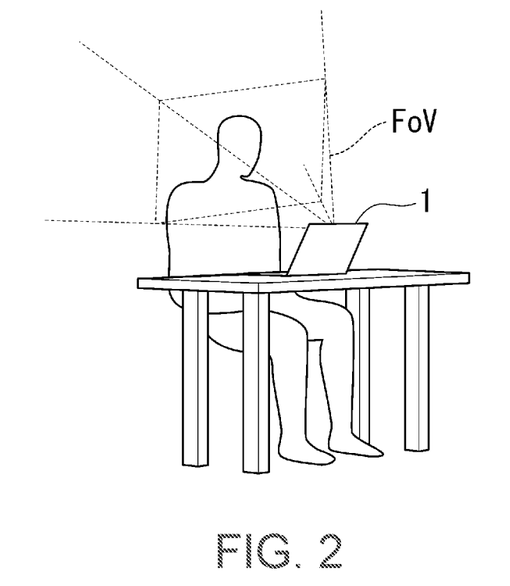
FIG. 2 is a diagram illustrating an example of a person detection range of the electronic apparatus according to one or more embodiments.

FIG. 2 is a diagram illustrating an example of a person detection range of the electronic apparatus 1 according to one or more embodiments. In the illustrated example, a detection range FoV (Field of View: detection viewing angle) in front of the electronic apparatus 1 is a person detectable range. For example, the electronic apparatus 1 detects a face area with a face captured therein from a captured image captured forward (on the front side) to determine whether or not a person (user) is present in front of the electronic apparatus 1. The detection range FoV corresponds to an imaging angle of view of the electronic apparatus 1. When the face area is detected from the captured image, the electronic apparatus 1 determines that the user is present. On the other hand, when no face area is detected from the captured image, the electronic apparatus 1 determines that the user is not present.

Further, when determining that the user is present as a result of the detection of the face area from the captured image, the electronic apparatus 1 boots the system to make the transition to the normal operating state while executing authentication processing on the way to authenticate whether or not the user is an authorized user. When determining that the user is the authorized user, the electronic apparatus 1 allows the user to use the electronic apparatus 1 (allows login) and continues the boot processing to make the transition to the normal operating state. On the other hand, when determining that the user is not the authorized user, the electronic apparatus 1 continues waiting for authentication without allowing the user to use the electronic apparatus 1 (without allowing the login). This user authentication upon boot-up is called "login authentication" below.

As the login authentication method, there are password authentication based on a password input by the user from the keyboard, face authentication to authenticate the user's face, fingerprint authentication to authenticate the user's fingerprint, and the like. When the login authentication by face authentication is enabled, the electronic apparatus 1 performs face authentication by matching facial features of a face captured in the face area detected from the captured image with facial features of a face of a preregistered authorized user.

Here, there is a case where face authentication may not be possible even when face detection from the captured image is possible. Therefore, there is concern that the system may be booted unnecessarily even when face authentication is not possible. For example, cases where face authentication is not possible even when face detection is possible include a case where the distance between the electronic apparatus 1 and a person is too far away or too close, and a case where there is no face near the center of the captured image. Further, when the face is not a front face such as in profile, face authentication may also not be performed properly. Further, when a face area is detected from a captured image captured with an IR camera (infrared camera) to perform face authentication, face authentication may not be performed properly in an environment that is too bright due to sunlight or the like. Therefore, the electronic apparatus 1 performs HPD processing as illustrated in FIG. 3.

Figure 3:
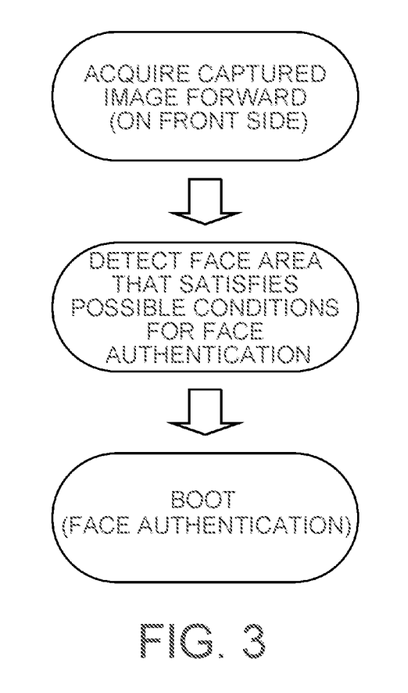
FIG. 3 is a diagram illustrating the outline of the HPD processing of the electronic apparatus according to one or more embodiments.

FIG. 3 is a diagram illustrating an outline of HPD processing of the electronic apparatus 1 according to one or more embodiments. The electronic apparatus 1 acquires a captured image in front thereof to detect a face area that satisfies possible conditions for face authentication, rather than to simply detect a face area from the captured image. Then, when detecting the face area that satisfies the possible conditions for face authentication, the electronic apparatus 1 boots the system, and after that, the electronic apparatus 1 performs login authentication by face authentication. This can prevent the electronic apparatus 1 from booting the system unnecessarily even when face authentication is not possible.

For example, in the case where the function of login authentication by face authentication is enabled, the electronic apparatus 1 boots the system when the face area that satisfies the possible conditions for face authentication is detected from the captured image. On the other hand, in the case where the function of login authentication by face authentication is disabled, the electronic apparatus 1 may also boot the system when the face area is detected regardless of whether or not the face area satisfies the possible conditions for face authentication is detected from the captured image. In the following description, a face detection mode to detect a face area that satisfies possible conditions for face authentication is called a "face authentication assist mode." On the other hand, a face detection mode to detect a face area from the captured image regardless of whether or not the face area satisfies the possible conditions for face authentication is called a "normal face detection mode."

Next, the configuration of the electronic apparatus 1 according to one or more embodiments will be described in detail.

Appearance Configuration of Electronic Apparatus

Figure 4:
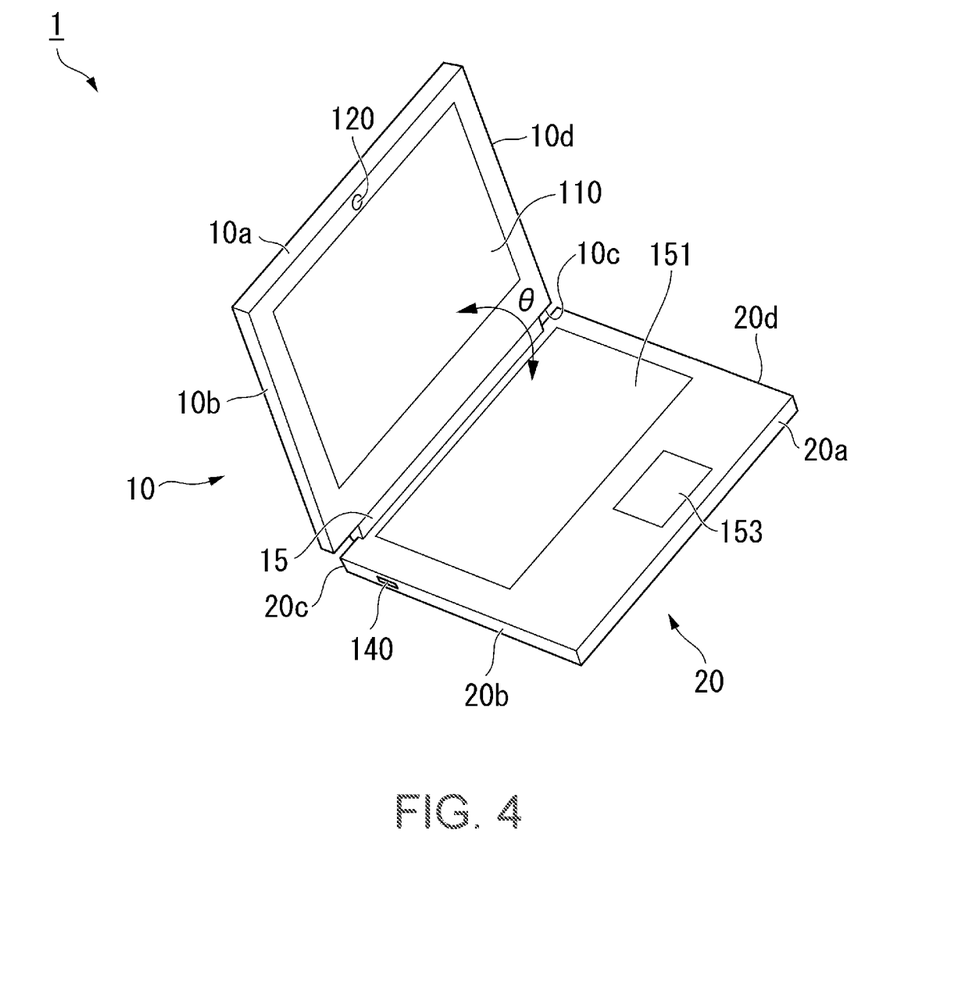
FIG. 4 is a perspective view illustrating an appearance configuration example of the electronic apparatus according to one or more embodiments.

FIG. 4 is a perspective view illustrating an appearance configuration example of the electronic apparatus 1 according to one or more embodiments.

The electronic apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. An open angle by the rotation between the first chassis 10 and the second chassis 20 is denoted by "θ" in FIG. 4.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the electronic apparatus 1 in FIG. 4 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when the user uses the electronic apparatus 1, and the electronic apparatus 1 is often used in a state where the open angle is typically about θ=100° to 130°. Note that the range of open angles θ to be the open state can be set arbitrarily according to the range of angles rotatable by the hinge mechanism 15 or the like.

A display unit 110 is provided on the inner face of the first chassis 10. The display unit 110 is configured to include a liquid crystal display (LCD) or an organic EL (Electro Luminescence) display, and the like. Further, an imaging unit 120 is provided in a peripheral area of the display unit 110 on the inner face of the first chassis 10. For example, the imaging unit 120 is arranged on the side of the side face 10a in the peripheral area of the display unit 110. Note that the position at which the imaging unit 120 is arranged is just an example, and it may be elsewhere as long as the imaging unit 120 can face a direction (frontward) to face the inner face of the first chassis 10.

In the open state, the imaging unit 120 captures an image in a predetermined imaging range in the direction (frontward) to face the inner face of the first chassis 10. The predetermined imaging range is a range of angles of view defined by an image sensor included in the imaging unit 120 and an optical lens provided in front of the imaging surface of the image sensor. For example, the imaging unit 120 can capture an image including a person present in front of the electronic apparatus 1.

Further, a power button 140 is provided on the side face 20b of the second chassis 20. The power button 140 is an operating element used by the user to give an instruction to power on or power off, the transition from the standby state to the normal operating state, the transition from the normal operating state to the standby state, or the like. Further, a keyboard 151 and a touch pad 153 are provided on the inner face of the second chassis 20 as an input device for accepting user's operation input. Note that a touch sensor may also be provided as the input device instead of or in addition to the keyboard 151 and the touch pad 153, or a mouse and an external keyboard may also be connected. When the touch sensor is provided, an area corresponding to the display surface of the display unit 110 may be constructed as a touch panel to accept operations. Further, a microphone used to input voice may be included in the input device.

In the closed state where the first chassis 10 and the second chassis 20 are closed, the display unit 110 and the imaging unit 120 provided on the inner face of the first chassis 10, and the keyboard 151 and the touch pad 153 provided on the inner face of the second chassis 20 are covered with each other's chassis faces, respectively, and the electronic apparatus 1 is put in a state of being disabled from fulfilling the functions.

Hardware Configuration of Electronic Apparatus

Figure 5:
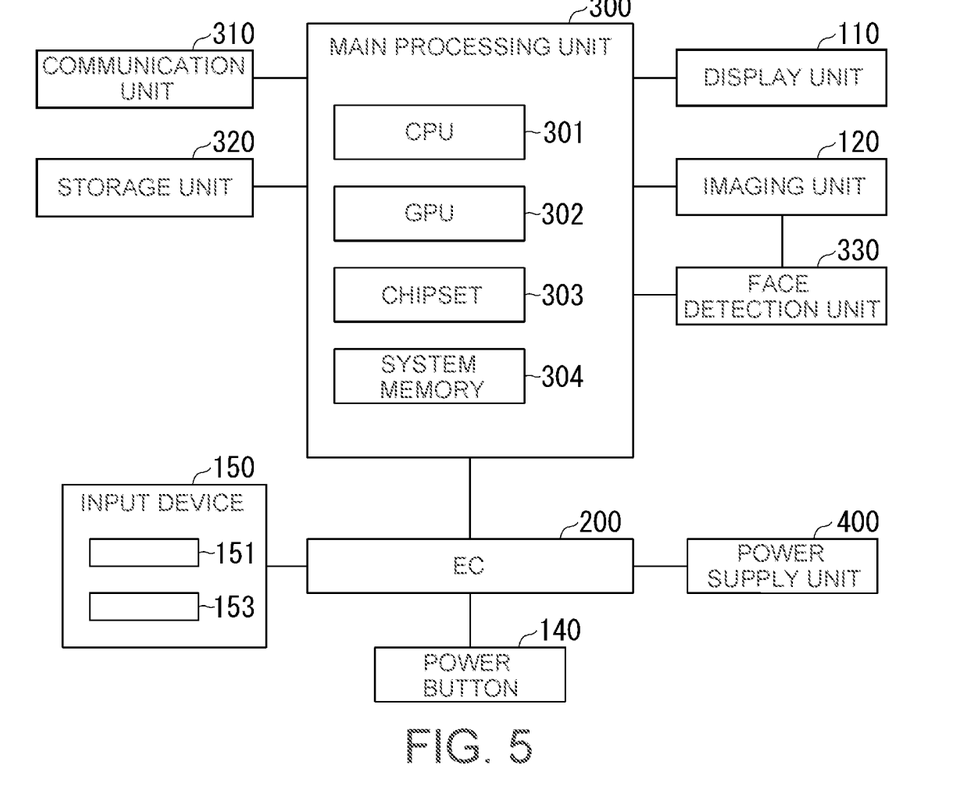
FIG. 5 is a block diagram illustrating an example of the hardware configuration of the electronic apparatus according to one or more embodiments.

FIG. 5 is a schematic block diagram illustrating an example of the hardware configuration of the electronic apparatus 1 according to one or more embodiments. The electronic apparatus 1 is configured to include the display unit 110, the imaging unit 120, the power button 140, an input device 150, an EC (Embedded Controller) 200, a main processing unit 300, a communication unit 310, a storage unit 320, a face detection unit 330, and a power supply unit 400. The display unit 110 displays display data (images) generated based on system processing executed by the main processing unit 300, processing of an application program running on the system processing, and the like.

The imaging unit 120 captures an image of an object within a predetermined angle of view in a direction (frontward) to face the inner face of the first chassis 10, and outputs image data of the captured image to the main processing unit 300 and the face detection unit 330. For example, the imaging unit 120 includes an RGB camera and an IR camera. The RGB camera is a normal camera for receiving visible light to capture an image. The IR camera is a camera for imaging infrared light emitted from an object.

For example, since the IR camera emits infrared light upon imaging, the power consumption upon imaging is higher than that of the RGB camera. Therefore, upon detecting a face area from a captured image in the standby state, the RGB camera is used, while upon login authentication by face authentication, the IR camera is used. Note that the imaging unit 120 may also include either of the IR camera and the RGB camera. Further, the IR camera may be used in the standby state, and the RGB camera may be used in authentication processing upon boot-up.

The power button 140 outputs, to the EC 200, operation signals according to user's operations. The input device 150 is an input unit for accepting user input, which is configured to include, for example, the keyboard 151 and the touch pad 153. In response to accepting operations on the keyboard 151 and the touch pad 153, the input device 150 outputs, to the EC 200, operation signals indicative of the operation content.

The power supply unit 400 supplies power to each unit according to the operating state of each unit of the electronic apparatus 1. The power supply unit 400 includes a DC (Direct Current)/DC converter. The DC/DC converter converts the voltage of DC power, supplied from an AC (Alternate Current)/DC adapter or a battery (battery pack) or a battery (battery pack) to a voltage required for each unit. The power with the voltage converted by the DC/DC converter is supplied to each unit through each power system. For example, the power supply unit 400 supplies power to each unit through each power system based on a control signal input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the own ROM, and executes the read control program to fulfill the function. The EC 200 operates independently of the main system processing unit 300 to control the operation of the main processing unit 300 and manage the operating state of the main processing unit 300. Further, the EC 200 is connected to the power button 140, the input device 150, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the electronic apparatus 1. Further, the EC 200 acquires operation signals from the power button 140 and the input device 150, and outputs, to the main processing unit 300, an operation signal related to processing of the main processing unit 300 among the acquired operation signals.

The main processing unit 300 is configured to include a CPU (Central Processing Unit) 301, a GPU (Graphic Processing Unit) 302, a chipset 303, and a system memory 304, where processing of various application programs is executable on an OS (Operating System) by system processing based on the OS.

The CPU 301 executes processing by BIOS, processing by the OS, processing by the application programs running on the OS, and the like. The CPU 301 controls the operating state of the system under the control of the chipset 303. For example, the CPU 301 executes boot processing to cause the operating state of the system to make the transition from the standby state to the normal operating state. Further, in the middle of the boot processing, the CPU 301 executes authentication processing (login authentication) to authenticate whether or not the user is an authorized user. When the function of login authentication by face authentication is set to be enabled, the CPU 301 executes the authentication processing by face authentication in the boot processing. On the other hand, when the function of login authentication by face authentication is set to be disabled, the CPU 301 executes authentication processing other than face authentication (for example, password authentication) in the boot processing.

When determining that the user is the authorized user in the authentication processing, the CPU 301 allows the user to use (allows the login) of the electronic apparatus 1, and continues the boot processing to make the transition to the normal operating state. On the other hand, when determining that the user is not the authorized user, the CPU 301 does not allow the user to use (does not allow the login) of the electronic apparatus 1 to continue waiting for authentication.

The GPU 302 is connected to the display unit 110. The GPU 302 executes image processing under the control of the CPU 301 to generate display data. The GPU 302 outputs the generated display data to the display unit 110.

The chipset 303 has a function as a memory controller, a function as an I/O controller, and the like. For example, the chipset 303 controls reading data from and writing data to the system memory 304, the storage unit 320, and the like by the CPU 301 and the GPU 302. Further, the chipset 303 controls input/output of data from the communication unit 310, the display unit 110, and the EC 200. Further, the chipset 303 has a function as a sensor hub. For example, the chipset 303 acquires the detection result of face detection from the face detection unit 330 to detect the presence of a person (user) based on the detection result in the HPD processing in order to control the system operating state.

The system memory 304 is used as a reading area of an execution program of the CPU 301 and a working area to write processed data. Further, the system memory 304 temporarily stores image data of a captured image(s) captured by the imaging unit 120.

Note that the CPU 301, the GPU 302, and the chipset 303 may also be integrated as one processor, or some or all of them may be configured as individual processors. For example, in the normal operating state, the CPU 301, the GPU 302, and the chipset 303 are all operating, but in the standby state, only at least some of the functions of the chipset 303 are operating. In the standby state, only a function required for HPD processing at least upon booting is operating.

The communication unit 310 is connected to other devices communicably through a wireless or wired communication network to transmit and receive various data. For example, the communication unit 310 is configured to include a wired LAN interface such as the Ethernet (registered trademark), a wireless LAN interface such as Wi-Fi (registered trademark), and the like.

The storage unit 320 is configured to include storage media, such as an HDD (Hard Disk Drive) or an SDD (Solid State Drive), a RAM, a ROM, and the like. The storage unit 320 stores the OS, device drivers, various programs such as applications, and various data acquired by the operation of the programs.

The face detection unit 330 is configured to include a processor which processes image data of a captured image captured by the imaging unit 120. The face detection unit 330 acquires image data of the captured image captured by the imaging unit 120 and temporarily stores the acquired image data in a memory. The memory for storing the image data may be the system memory 304 or a memory connected to the above-mentioned processor included in the face detection unit 330.

For example, the face detection unit 330 processes the image data of the captured image acquired from the imaging unit 120 to detect a face area from the captured image in the face authentication assist mode or the normal face detection mode. The face detection unit 330 transmits, to the chipset 303 of the main processing unit 300, the face detection result by the face authentication assist mode or the normal face detection mode.

Note that in the standby state, the face detection unit 330 is also operating. As described above, in the standby state, the face detection unit 330 acquires image data of a captured image captured with the RGB camera of the imaging unit 120 to detect a face area. Thus, power consumption in the standby state can be reduce by using the RGB camera without using the IR camera.

Functional Configuration of Electronic Apparatus 1

Next, a functional configuration in which the electronic apparatus 1 boots the system by detecting a face area from a captured image in the face authentication assist mode or the normal face detection mode will be described in detail.

Figure 6:
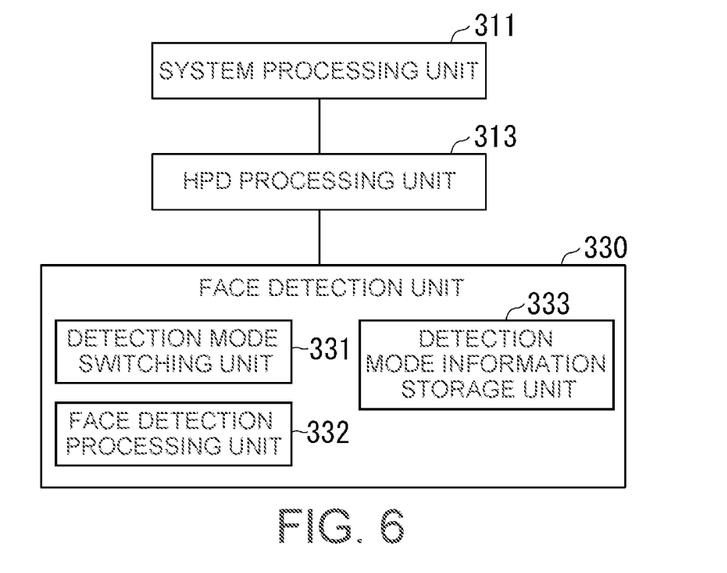
FIG. 6 is a block diagram illustrating an example of the functional configuration of the electronic apparatus according to one or more embodiments.

FIG. 6 is a schematic block diagram illustrating an example of the functional configuration of the electronic apparatus 1 according to one or more embodiments. The electronic apparatus 1 includes a system processing unit 311, an HPD processing unit 313, and the face detection unit 330.

The system processing unit 311 is a functional component in which the CPU 301 executes processing by BIOS and OS. The system processing unit 311 controls the operating state of the system under the control of the HPD processing unit 313. For example, when acquiring a boot instruction from the HPD processing unit 313, the system processing unit 311 executes boot processing to cause the operating state of the system to make the transition from the standby state to the normal operating state. Further, in the middle of the boot processing, the system processing unit 311 executes authentication processing (login authentication) to authenticate whether or not the user is an authorized user. When the function of login authentication by face authentication is set to be enabled, the system processing unit 311 executes the authentication processing by face authentication in the boot processing. On the other hand, when the function of login authentication by face authentication is set to be disabled, the system processing unit 311 executes authentication processing other than face authentication (for example, password authentication) in the boot processing.

Note that the system processing unit 311 causes the operating state of the system to make the transition from the normal operating state to the standby state when acquiring an instruction from the HPD processing unit 313 to cause the operating state of the system to make the transition to the standby state.

The HPD processing unit 313 is a functional component in which the chipset 303 executes HPD processing based on the detection result by the face detection unit 330. When the function of login authentication by face authentication is set to be enabled, the HPD processing unit 313 gives an instruction to the face detection unit 330 to set the mode to the face authentication assist mode. Then, in the standby state, when a face area that satisfies possible conditions for face authentication is detected from the captured image by the face detection unit 330, the HPD processing unit 313 determines that the user has approached the electronic apparatus 1, and gives the boot instruction to the system processing unit 311 to execute the boot processing.

On the other hand, when the function of login authentication by face authentication is set to be disabled, the HPD processing unit 313 instructs the face detection unit 330 to set the mode to the normal face detection mode. Then, in the standby state, when a face area is detected from the captured image by the face detection unit 330, the HPD processing unit 313 determines that the user has approached the electronic apparatus 1, and gives the boot instruction to the system processing unit 311 to execute the boot processing.

In the normal operating state, for example, the HPD processing unit 313 gives an instruction to the face detection unit 330 to set the mode to the normal face detection mode. Then, in the normal operating state, when a face area is no longer detected from the captured image by the face detection unit 330 from the state in which the face area is being detected, the HPD processing unit 313 determines that the user has left the electronic apparatus 1, and gives an instruction to the system processing unit 311 to cause the operating state of the system to make the transition from the normal operating state to the standby state.

The face detection unit 330 includes a detection mode switching unit 331, a face detection processing unit 332, and a detection mode information storage unit 333. For example, the detection mode switching unit 331 and the face detection processing unit 332 are functional components implemented by the processor included in the face detection unit 330, and the detection mode information storage unit 333 is included in the memory connected to the processor.

In response to the instruction from the HPD processing unit 313, the detection mode switching unit 331 switches between the face authentication assist mode and the normal face detection mode. In the detection mode information storage unit 333, a face detection processing program executed in the face authentication assist mode and a face detection processing program executed in the normal face detection mode are stored. When acquiring an instruction to set the mode to the face authentication assist mode from the HPD processing unit 313, the detection mode switching unit 331 reads, from the detect mode information storage unit 333, the face detection processing program executed in the face authentication assist mode, and sets the mode to the face authentication assist mode. On the other hand, when acquiring an instruction to set the mode to the normal face detection mode from the HPD processing unit 313, the detection mode switching unit 331 reads, from the detect mode information storage unit 333, the face detection processing program executed in the normal face detection mode, and sets the mode to the normal face detection mode.

When the mode is set to the face authentication assist mode, the face detection processing unit 332 detects, from the captured image, a face area that satisfies possible conditions for face authentication. On the other hand, when the mode is set to the normal face detection mode, the face detection processing unit 332 detects, from the captured image, a face area regardless of whether or not the face area satisfies the possible conditions for face authentication. Then, the face detection processing unit 332 transmits the detection result to the HPD processing unit 313.

Possible Conditions for Face Authentication

Here, the possible conditions for face authentication will be described. As described above, cases where face authentication is not possible even when face detection is possible include a case where the distance between the electronic apparatus 1 and a person is too far away or too close, a case where there is no face near the center of the captured image, a case where the face is not a front face, and a case where the environment is too bright. Therefore, the following (1) to (4) can be exemplified as the possible conditions for face authentication.

(1) A condition on the size of a face captured in the captured image relative to the area of the captured image can be exemplified as a possible condition for face authentication. When the distance between the electronic apparatus 1 and the person is far away from each other, the face area detected from the captured image becomes small. On the other hand, when the distance between the electronic apparatus 1 and the person is close to each other, the face area detected from the captured image becomes large. Therefore, as threshold values for the size of the face area detected from the captured image, a first threshold value on the small side and a second threshold value on the large side are preset, and such a condition that the size of the face area is equal to or more than the first threshold value and less than the second threshold value is set to the possible condition for face authentication. Thus, when the distance to the person is too far away or too close, since the possible condition for face authentication is not satisfied, the electronic apparatus 1 detects no face area, while when the distance to the person is appropriate to perform face authentication, the electronic apparatus 1 can detect the face area as a face area that satisfies the possible condition for face authentication. The first threshold value and the second threshold value can be set arbitrarily based on the imaging angle of view of the imaging unit 120, and the like.

(2) A condition on the position of a face captured in the captured image within a captured image area can be exemplified as a possible condition for face authentication. For example, by setting a range including the center of the captured image and smaller than the range of the captured image area as a detection range to detect a face area from the captured image, such a condition that a face is captured within the detection range is set as a possible condition for face authentication. Therefore, since edge sides of the captured image do not satisfy the possible condition for face authentication, any face area is not detected on the edge sides. Thus, the electronic apparatus 1 can detect only a face area with a face captured near the center thereof as a face area that satisfies the possible condition for face authentication. The detection range for detecting the face area can be set arbitrarily according to the range of the imaging angle of view of the imaging unit 120 and the like.

(3) A condition on the orientation of a face captured in the captured image can be exemplified as a possible condition for face authentication. For example, by setting only a front face among faces captured in the captured image as a detection target, such a condition that the face orientation is the front face is set as a possible condition for face authentication. Therefore, when the orientation of the captured face is not the front face such as a profile, since it does not satisfy the possible condition for face authentication, no face is detected. Thus, the electronic apparatus 1 can detect only the front face as a face in the face area that satisfies the possible condition for face authentication.

(4) A condition on the usage environment brightness can be exemplified as a possible condition for face authentication. For example, by setting the upper limit of the brightness (luminance) of the usage environment as a third threshold value, such a condition that an average value of the brightness (luminance) of an imaging target environment calculated from image data of the captured image is less than the third threshold value is set as a possible condition for face authentication. The brightness (luminance) of the imaging target environment can be calculated based on the imaging conditions of the imaging unit 120, the luminance value of image data of the captured image, and the like. Therefore, when the environment is too bright, since it does not satisfy the possible condition for face authentication, any face area is detected. Thus, the electronic apparatus 1 can detect only a face area including a face captured in an environment with an appropriate brightness as the face area that satisfies the possible condition for face authentication. As the brightness condition, the lower limit of the brightness (luminance) may also be set as the possible condition for face authentication instead of or in addition to the upper limit of the brightness (luminance).

All of the above-described conditions (1) to (4) may be set as the possible conditions for face authentication, or some of them may be set as the possible conditions for face authentication. When the mode is set to the face authentication assist mode, the face detection processing unit 332 detects, from the captured image, a face area that satisfies the possible conditions for face authentication as described above.

On the other hand, when the mode is set to the normal face detection mode, the face detection processing unit 332 detects, from the captured image, a face area regardless of whether or not the face area satisfies the possible conditions for face authentication. In other words, the face detection processing unit 332 also detects any other face area that does not satisfy the possible conditions for face authentication described above. For example, the face detection processing unit 332 detects a face area from the captured image without setting some or all of the conditions on the size of a face captured in the captured image relative to the area of the captured image, on the position of the face, on the orientation of the face, and the brightness in the ambient environment. The face detection processing unit 332 may also detect the entire area of the captured image as the detection range regardless of the size of the face area and the orientation of the face.

Note that when the mode is set to the normal face detection mode, the face detection processing unit 332 may also detect a face area, as the detection area, an area wider than the detection range when the mode is set to the face authentication assist mode but narrower than the entire area of the captured image.

Operation of HPD Processing

Figure 7:
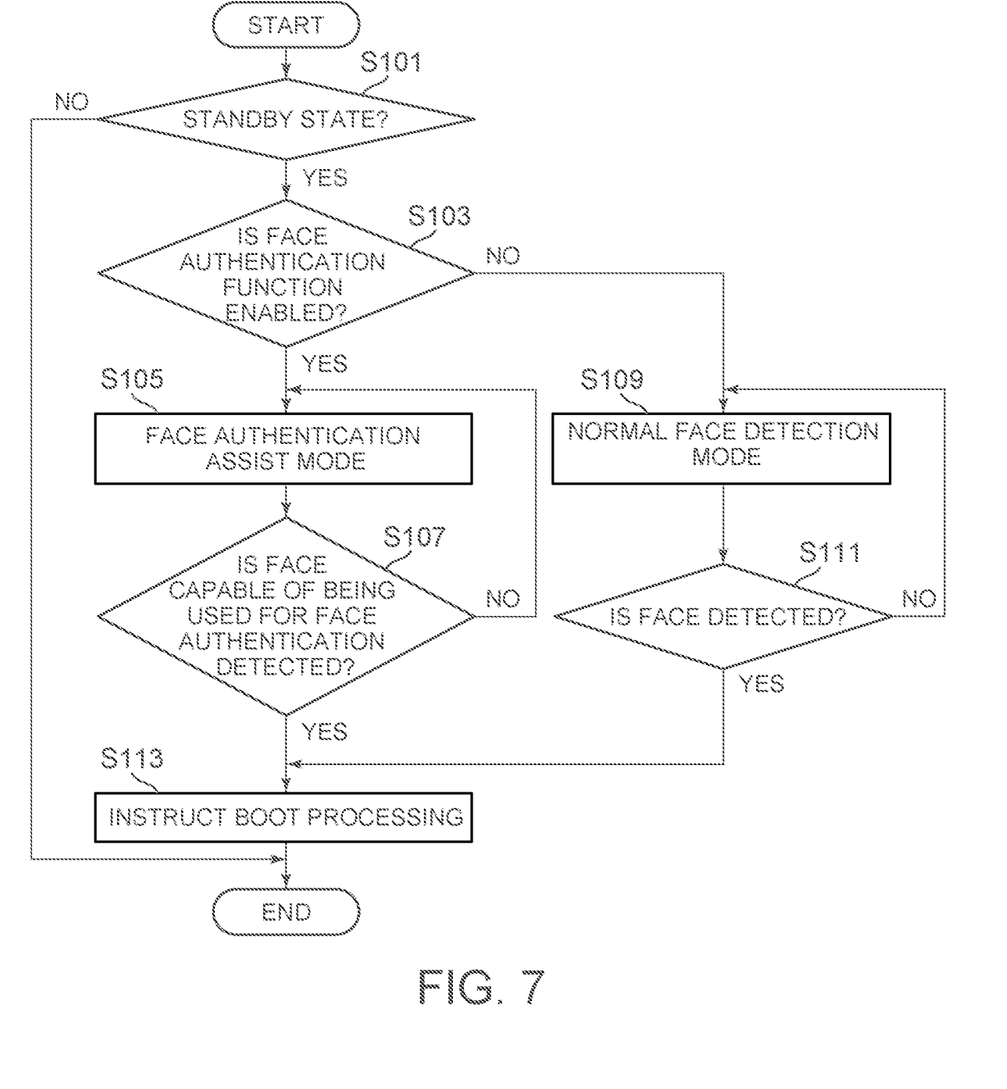
FIG. 7 is a flowchart illustrating an example of HPD processing in a standby state according to one or more embodiments.

Referring next to FIG. 7, the operation of HPD processing executed by the electronic apparatus 1 in the standby state will be described.

FIG. 7 is a flowchart illustrating an example of HPD processing in the standby state according to one or more embodiments.

(Step S101) The HPD processing unit 313 determines whether or not the operating state of the system is the standby state. When determining that the operating state of the system is the standby state (YES), the HPD processing unit 313 proceeds to a process in step S103. On the other hand, when determining that the operating state of the system is not the standby state (NO), the HPD processing unit 313 does not perform this processing.

(Step S103) The HPD processing unit 313 determines whether or not the function of login authentication by face authentication is enabled. When determining that the function of login authentication by face authentication is enabled (YES), the HPD processing unit 313 instructs the face detection unit 330 to set the mode to the face authentication assist mode, and the procedure proceeds to a process in step S105. On the other hand, when determining that the function of login authentication by face authentication is disabled (NO), the HPD processing unit 313 instructs the face detection unit 330 to set the mode to the normal face detection mode, and the procedure proceeds to a process in step S109.

(Step S105) The face detection unit 330 detects a face area that satisfies possible conditions for face authentication from the captured image in the face authentication assist mode, and transmits the detection result to the HPD processing unit 313. Then, the procedure proceeds to a process in step S107.

(Step S107) Based on the detection result by the face detection unit 330, the HPD processing unit 313 determines whether or not a face area that satisfies the possible conditions for face authentication is detected. When determining that the face area that satisfies the possible conditions for face authentication is detected (YES), the HPD processing unit 313 gives the boot instruction to the system processing unit 311 to execute the boot processing (step S113). On the other hand, when determining that no face area that satisfies the possible conditions for face authentication is detected (NO), the procedure returns to the process in step S105 to continue the standby state.

(Step S109) The face detection unit 330 detects a face area from the captured image in the normal face detection mode, and transmits the detection result to the HPD processing unit 313. Then, the procedure proceeds to a process in step S111.

(Step S111) Based on the detection result by the face detection unit 330, the HPD processing unit 313 determines whether or not a face area is detected regardless of whether or not the face area satisfies the possible conditions for face authentication. When determining that the face area is detected (YES), the HPD processing unit 313 gives the boot instruction to the system processing unit 311 to execute the boot processing (step S113). On the other hand, when determining that no face area is detected (NO), the procedure returns to the process in step S109 to continue the standby state.

Operation of Boot Processing

Next, the operation of the boot processing executed by the system processing unit 311 in response to receiving the boot instruction by the HPD processing described above will be described.

Figure 8:
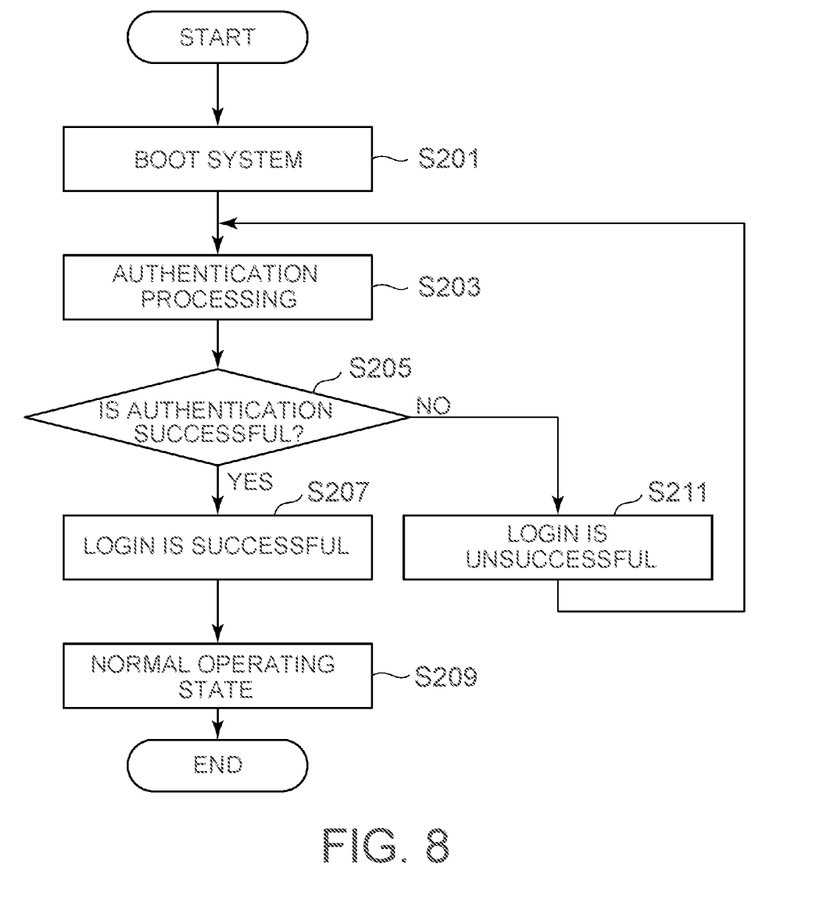
FIG. 8 is a flowchart illustrating an example of boot processing according to one or more embodiments.

FIG. 8 is a flowchart illustrating an example of the boot processing according to one or more embodiments. Here, it is assumed that the electronic apparatus 1 is placed open on a desk or the like in the standby state.

(Step S201) In response to the boot instruction from the HPD processing unit 313, the system processing unit 311 starts system boot processing. For example, the system processing unit 311 starts OS boot processing after executing boot processing by BIOS, and proceeds to a process in step S203.

(Step S203) The system processing unit 311 executes authentication processing to login to the OS. For example, when the function of login authentication by face authentication is set to be enabled, the system processing unit 311 executes authentication processing by face authentication. On the other hand, when the function of login authentication by face authentication is set to be disabled, the system processing unit 311 executes authentication processing by any authentication type other than face authentication (for example, by password authentication). Then, the system processing unit 311 proceeds to a process in step S205.

(Step S205) The system processing unit 311 determines whether or not the authentication result is successful. When determining that the authentication result is successful (YES), the system processing unit 311 proceeds to a process in step S207. On the other hand, when determining that the authentication result is unsuccessful (NO), the system processing unit 311 proceeds to a process in step S211.

(Step S207) When the authentication result is successful, the system processing unit 311 gives a notice that the login is successful (for example, displays the notice on the display unit 110), and continues the OS boot processing. Then, the system processing unit 311 proceeds to a process in step S209.

(Step S209) The system processing unit 311 completes the authentication processing, and causes the operating state of the system to make the transition to the normal operating state.

(Step S211) When the authentication result is unsuccessful, the system processing unit 311 gives a notice that the login is unsuccessful (for example, displays the notice on the display unit 110), and returns to step S203. Note that when the authentication processing is unsuccessful continuously a predetermined number of times, the system processing unit 311 may stop the authentication processing to make a transition to a login-disabled state.

Summary of First Embodiment

As described above, the electronic apparatus 1 according to one or more embodiments executes the boot processing to boot the system from the standby state based on the authentication result by face authentication. For example, the electronic apparatus 1 includes a memory (for example, the system memory 304) which temporarily stores image data of an image (captured image) captured by the imaging unit 120 (an example of an imaging device), and a processor (for example, the chipset 303 and the face detection unit 330) which performs processing based on the image data stored in the memory. In the standby state, the face detection unit 330 processes the image data of the captured image captured by the imaging unit 120 and stored in the memory to perform face detection processing to detect, from the captured image, a face area in which a face that satisfies possible conditions for face authentication is captured. Further, when the face area that satisfies the possible conditions for face authentication is detected from the captured image by the above face detection processing, the chipset 303 performs boot instruction processing to execute the boot processing.

Thus, in the standby state, since the electronic apparatus 1 boots the system only when the face area including the face capable of being used for face authentication is detected from the captured image, unnecessary booting can be reduced. For example, the electronic apparatus 1 can be prevented from booting the system when the user or any person other than the user just passes by without intention to use the electronic apparatus 1.

Further, the function of face authentication (for example, the function of login authentication) can be set to be enabled or disabled, and when the function of face authentication is set to be enabled, the face detection unit 330 (an example of a processor) detects a face area that satisfies possible conditions for face authentication by face detection processing.

Thus, when the function of face authentication is enabled, since the electronic apparatus 1 boots the system only when the face area including the face capable of being used for face authentication is detected from the captured image in the standby state, unnecessary booting can be reduced.

For example, the possible conditions for face authentication include the condition on the size of the face captured in the captured image relative to the area of the captured image.

Thus, since the electronic apparatus 1 does not boot the system in a situation unable to perform face authentication due to the fact that a person is too far away from or too close to the electronic apparatus 1, unnecessary booting can be reduced.

Further, the possible conditions for face authentication include the condition on the position of the face captured in the captured image within the captured image area.

Thus, since the electronic apparatus 1 does not boot the system in a situation, unable to perform face authentication due to the fact that there is a person in a position off to the side, not in front of the electronic apparatus 1, unnecessary booting can be reduced.

Further, the possible conditions for face authentication include the condition on the face orientation.

Thus, since the electronic apparatus 1 does not boot the system in a situation unable to perform face authentication due to the fact that a person does not face the electronic apparatus 1, such as to look away, unnecessary booting can be reduced.

Further, the possible conditions for face authentication include the condition on the brightness of the usage environment of the electronic apparatus 1.

Thus, since the electronic apparatus 1 does not boot the system in a situation unable to perform face authentication because the usage environment is too bright due to sunlight or the like, unnecessary booting can be reduced.

Further, when the function of face authentication is set to be disabled, the face detection unit 330 (the example of the processor) detects a face area with a face captured therein from the captured image in the face detection processing regardless of whether or not the face area satisfies the possible conditions for face authentication. Further, when the face area is detected from the captured image by the above face detection processing, the chipset 303 performs boot instruction processing to execute the boot processing.

Thus, when the function of face authentication is disabled, the electronic apparatus 1 can boot the system by detecting a face area with a face captured therein from the captured image regardless of whether or not the face area satisfies the possible conditions for face authentication in a wider range and conditions compared to the case when the function of face authentication is enabled. Therefore, when the function of face authentication is disabled, it can be easier for the electronic apparatus 1 to boot the system.

Further, a control method for the electronic apparatus 1 according to one or more embodiments to execute boot processing for booting the system from the standby state based on the authentication result by face authentication includes: a step of causing the face detection unit 330 (the example of the processor) to process image data of an image (captured image) captured by the imaging unit 120 (the example of the imaging device) and stored in a memory (for example, the system memory 304) in the standby state in order to detect, from the captured image, a face area including a face that satisfies possible conditions for face authentication; and a step in which when the face area that satisfies the possible conditions for face authentication is detected from the captured image, the chipset 303 (the example of the processor) executes boot processing.

Thus, since the electronic apparatus 1 boots the system only when the face area including the face capable of being used for face authentication is detected from the captured image in the standby state, unnecessary booting can be reduced. For example, the electronic apparatus 1 can be prevented from booting the system when the user or any person other than the user just passes by without intention to use the electronic apparatus 1.

Second Embodiment

Next, a second embodiment of the present invention will be described.

In the first embodiment, when the function of login authentication by face authentication is enabled, a face area that satisfies the possible conditions for face authentication is detected from the captured image, but after a face area is detected from the captured image regardless of whether or not the face area satisfies the possible conditions for face authentication, it may be determined whether or not the face area satisfies the possible conditions for face authentication.

Figure 9:
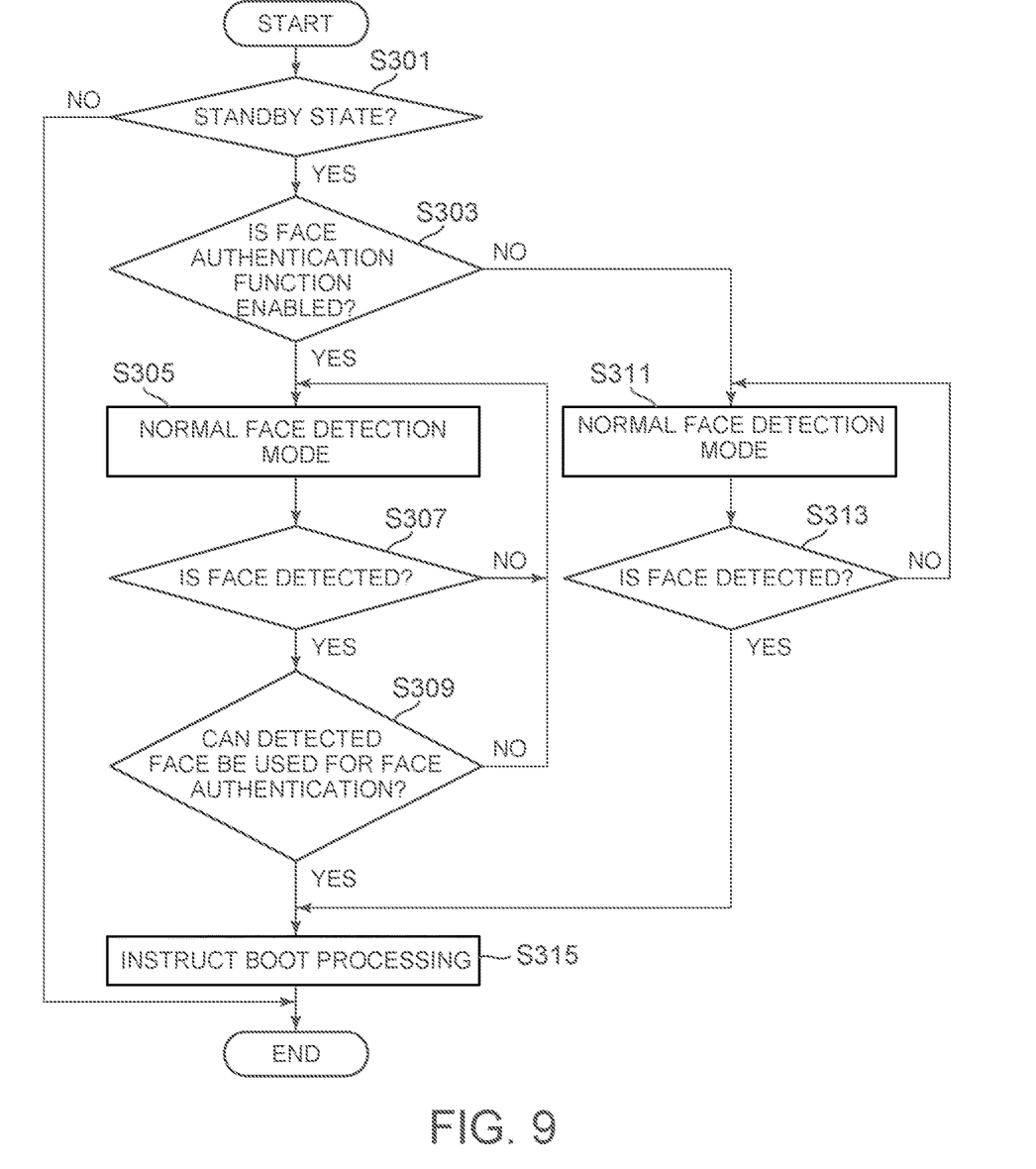
FIG. 9 is a flowchart illustrating an example of HPD processing in the standby state according to one or more embodiments.

FIG. 9 is a flowchart illustrating an example of HPD processing in the standby state according to one or more embodiments.

(Step S301) The HPD processing unit 313 determines whether or not the operating state of the system is the standby state. When determining that the operating state of the system is the standby state (YES), the HPD processing unit 313 proceeds to a process in step S303. On the other hand, when determining that the operating state of the system is not the standby state (NO), the HPD processing unit 313 does not perform this processing.

(Step S303) The HPD processing unit 313 determines whether or not the function of login authentication by face authentication is enabled. When determining that the function of login authentication by face authentication is enabled (YES), the HPD processing unit 313 instructs the face detection unit 330 to set the mode to the normal face detection mode, and the procedure proceeds to a process in step S305. On the other hand, when determining that the function of login authentication by face authentication is disabled (NO), the HPD processing unit 313 instructs the face detection unit 330 to set the mode to the normal face detection mode, and the procedure proceeds to a process in step S311.

(Step S305) In the normal face detection mode, the face detection unit 330 detects a face area from the captured image, and proceeds to a process in step S307.

(Step S307) The face detection unit 330 determines whether or not the face area is detected. When determining that the face area is detected (YES), the face detection unit 330 proceeds to a process in step S309. On the other hand, when determining that no face area is detected (NO), the face detection unit 330 returns to the process in step S305.

(Step S309) The face detection unit 330 determines whether or not the detected face area is a face area that satisfies possible conditions for face authentication. When determining that the detected face area is the face area that satisfies the possible conditions for face authentication (YES), the face detection unit 330 transmits, to the HPD processing unit 313, the detection result indicating that the face area that satisfies the possible conditions for face authentication is detected, and the procedure proceeds to a process in step S315. On the other hand, when determining that the detected face area is not the face area that satisfies the possible conditions for face authentication (NO), since no face area that satisfies the possible conditions for face authentication is detected, the face detection unit 330 returns to the process in step S305.

(Step S311) In the normal face detection mode, the face detection unit 330 detects a face area from the captured image, and transmits the detection result to the HPD processing unit 313. Then, the face detection unit 330 proceeds to a process in step S313.

(Step S313) The face detection unit 330 determines whether or not the face area is detected. When determining that the face area is detected (YES), the face detection unit 330 transmits, to the HPD processing unit 313, the detection result indicating that the face area is detected, and the procedure proceeds to a process in step S315. On the other hand, when determining that no face area is detected (NO), the face detection unit 330 returns to the process in step S311.

(Step S315) Based on the detection result by the face detection unit 330, the HPD processing unit 313 gives the boot instruction to the system processing unit 311 to execute the boot processing.

While the first and second embodiments of this invention have been described in detail above with reference to the accompanying drawings, the specific configurations are not limited to the above-described embodiments, and design changes are included without departing from the scope of this invention. For example, the respective processing configurations described above in the respective embodiments described above can be combined arbitrarily.

Further, in the aforementioned embodiments, the configuration example in which the imaging unit 120 is built in the electronic apparatus 1 is described, but the present invention is not limited to this example. For example, the imaging unit 120 does not have to be built in the electronic apparatus 1, which may also be attachable to the electronic apparatus 1 (for example, onto any of the side faces 10a, 10b, 10c, and the like) and communicably connected to the electronic apparatus 1 wirelessly or by wire as an external accessory.

Further, in the aforementioned embodiments, the electronic apparatus 1 detects a face area with a face captured therein from a captured image to detect the presence of the user, but the electronic apparatus 1 may also use a distance sensor (for example, a proximity sensor or the like) together to detect the distance to an object in order to detect the presence of the user. For example, the distance sensor is provided on the inner face side of the first chassis 10 to detect an object (for example, a person) present within a detection range in a direction (forward) to face the inner face of the first chassis 10. As an example, the distance sensor may be an infrared distance sensor configured to include a light-emitting part for emitting infrared light and a light-receiving part for receiving reflected light which is the infrared light returned after being emitted and reflected on the surface of the object. Note that the distance sensor may be a sensor using infrared light emitted by a light-emitting diode, or a sensor using an infrared laser emitting a light beam narrower in wavelength band than the infrared light emitted by the light-emitting diode. Further, the distance sensor is not limited to the infrared distance sensor, and it may be a sensor using any other method, such as an ultrasonic sensor or a sensor using a UWB (Ultra Wide Band) radar, as long as the sensor detects the distance to the object. Further, the distance sensor does not have to be built in the electronic apparatus 1, which may also be attachable to the electronic apparatus 1 (for example, onto any of the side faces 10a, 10b, 10c, and the like) and communicably connected to the electronic apparatus 1 wirelessly or by wire as an external accessory. Further, the imaging unit 120 and the distance sensor may be integrally constructed. Further, when the face authentication function is set to be disabled, the electronic apparatus 1 may also detect the presence of the user by detecting an area in which at least part of the body, not just a face, is captured.

Further, in the aforementioned embodiments, the example in which the face detection unit 330 is provided separately from the chipset 303 is illustrated, but some or all of the functions of the face detection unit 330 may be provided in the chipset 303, or provided in a processor integrated with the chipset 303. Further, some or all of the functions of the face detection unit 330 may be provided in the EC 200. Further, in the aforementioned embodiments, the example in which the chipset 303 includes the HPD processing unit 313 is illustrated, but some or all of the functions of the HPD processing unit 313 may be provided in the EC 200.

Further, a hibernation state, a power-off state, and the like may be included as the standby state described above. The hibernation state corresponds, for example, to S4 state defined in the ACPI specification. The power-off state corresponds, for example, to S5 state (shutdown state) defined in the ACPI specification. Further, a state in which at least the display of the display unit appears to be OFF (screen OFF), or a screen lock state may be included as the standby state. The screen lock is a state in which an image preset to make a content being processed invisible (for example, an image for the screen lock) is displayed on the display unit, that is, an unusable state until the lock is released (for example, until the user is authenticated).

Note that the electronic apparatus 1 described above has a computer system therein. Then, a program for implementing the function of each component included in the electronic apparatus 1 described above may be recorded on a computer-readable recording medium so that the program recorded on this recording medium is read into the computer system and executed to perform processing in each component included in the electronic apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the electronic apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the electronic apparatus 1 in the above-described embodiments may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the electronic apparatus 1 in the aforementioned embodiments is not limited to the PC, the tablet terminal device, the smartphone, or the like, and the present invention can also be applied to a household electric appliance or a commercial electric appliance. As the household electric appliance, the present invention can be applied to a TV set, a refrigerator or a microwave oven having a display unit, or the like. For example, ON/OFF of a TV screen or ON/OFF of a screen of the display unit of the refrigerator or the microwave oven can be controlled in response to the approach or leave of a person. As the commercial electric appliance, the present invention can be applied to a vending machine, a multimedia station, or the like. For example, an operating state such as ON/OFF of lighting of the vending machine or ON/OFF of a screen of a display unit of the multimedia station can be controlled in response to the approach or leave of a person.

DESCRIPTION OF SYMBOLS 1 electronic apparatus
10 first chassis
20 second chassis
15 hinge mechanism
110 display unit
120 imaging unit
140 power button
150 input device
151 keyboard
153 touch pad
200 EC
300 main processing unit
301 CPU
302 GPU
303 chipset
304 system memory
310 communication unit
320 storage unit
311 system processing unit
313 HPD processing unit
330 face detection unit
331 detection mode switching unit
332 face detection processing unit
333 detection mode information storage unit
400 power supply unit

The invention claimed is:

1. An electronic apparatus which executes boot processing to boot a system from a standby state, comprising:
a memory which temporarily stores image data of an image captured by an imaging device; and
a processor which performs processing based on image data stored in the memory, wherein
a face authentication function of the electronic apparatus is configured to be enabled or disabled,
the processor is configured to perform, in response to the face authentication function being enabled:
face detection processing to process the image data in the standby state in order to detect, from the image, a first face area in which a face that satisfies possible conditions for the face authentication is captured; and
boot instruction processing to execute the boot processing in response to detecting the first face area that satisfies the possible conditions,
the processor is configured to perform, in response to the face authentication function being disabled:
processing of the image data to detect a second face area regardless of whether or not the second face area satisfies the possible conditions for the face authentication; and
the boot instruction processing to execute the boot processing in response to detecting the second face area, and
an area for detecting the first face area is smaller than an area for detecting the second face area.

2. The electronic apparatus according to claim 1, wherein the possible conditions for the face authentication include a condition on a size of a face captured in the image relative to an area of the image, and
the condition on the size of the face is based on a imaging angle of view of the imaging device.

3. The electronic apparatus according to claim 1, wherein the possible conditions for the face authentication include a condition on a position of a face captured in the image within an area of the image, and
the condition on the position of the face is based on a imaging angle of view of the imaging device.

4. The electronic apparatus according to claim 1, wherein the possible conditions for the face authentication include a condition on an orientation of a face captured in the image.

5. The electronic apparatus according to claim 1, wherein the possible conditions for the face authentication include a condition on a brightness of a usage environment of the electronic apparatus.

6. A control method for an electronic apparatus including: a memory which temporarily stores image data of an image captured by an imaging device; and a processor which performs processing based on image data stored in the memory, to execute boot processing for booting a system from a standby state, the control method comprising:
determining whether or not a face authentication function of the electronic apparatus is enabled or disabled;
in response to determining the face authentication is enabled:
processing the image data in the standby state in order to detect, from the image, a first face area in which a face that satisfies possible conditions for the face authentication is captured; and
performing boot instruction processing to execute the boot processing in response to detecting the first face area that satisfies the possible conditions; and
in response to the face authentication function being disabled:
processing the image data to detect a second face area regardless of whether or not the second face area satisfies the possible conditions for the face authentication; and
performing the boot instruction processing to execute the boot processing in response to detecting the second face area, wherein
an area for detecting the first face area is smaller than an area for detecting the second face area.

* * * * *